June 12, 1956  C. E. DESLIPPE  2,749,997
KNOCKDOWN, POWER-PROPELLED CADDY VEHICLE
Filed Dec. 1, 1953  2 Sheets-Sheet 1
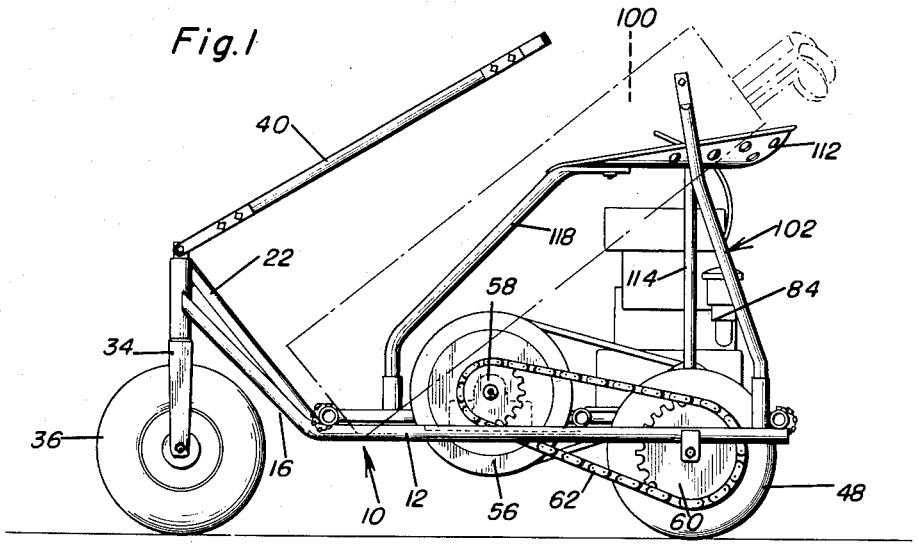
Fig.1
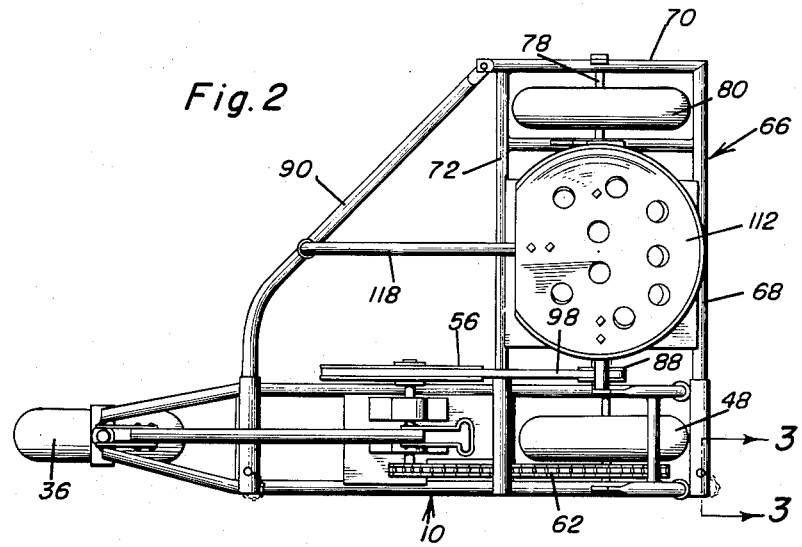
Fig.2
Fig.3
Clifford E. Deslippe
INVENTOR.
BY Clarence A. O'Brien
and Harvey B. Jackson
Attorneys June 12, 1956   C. E. DESLIPPE   2,749,997
KNOCKDOWN, POWER-PROPELLED CADDY VEHICLE
Filed Dec. 1, 1953   2 Sheets-Sheet 2

Clifford E. Deslippe
INVENTOR.

2,749,997
KNOCKDOWN, POWER-PROPELLED CADDY VEHICLE

Clifford E. Deslippe, Livonia, Mich., assignor of twenty-four and one-half per cent to Andrew R. Sinelli and twenty-four and one-half per cent to Dyer C. Baird, Detroit, Mich.

Application December 1, 1953, Serial No. 395,500

2 Claims. (Cl. 180—25)

This invention relates in general to improvements in sporting equipment, and more specifically to a novel portable caddy cart.

The primary object of this invention is to provide an improved caddy cart which is so constructed whereby it may easily and quickly traverse the terrain of a golf course carrying both a golf bag and the player.

Another object of this invention is to provide an improved portable caddy cart which is intended to support a golf bag for movement over a golf course, the golf bag being so supported whereby the golf clubs carried thereby may be quickly and easily removed and replaced.

Another object of this invention is to provide an improved portable caddy cart which includes a power unit and a drive wheel, the caddy cart being provided with novel drive means whereby the power unit may be quickly and easily separated from the drive wheel.

A still further object of this invention is to provide an improved portable caddy cart which includes a golf bag supporting rack and a seat, the caddy cart being formed of a plurality of quickly and easily separable parts whereby the same may be conveniently positioned within a trunk of a vehicle for carrying the caddy cart from one's home to a golf course and return.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the caddy cart which is the subject of this invention, a golf bag carried thereby and shown in phantom lines;

Figure 2 is a top plan view of the caddy cart of Figure 1 and shows the general details thereof including a cross support member for a golf bag, the golf bag being omitted;

Figure 4:
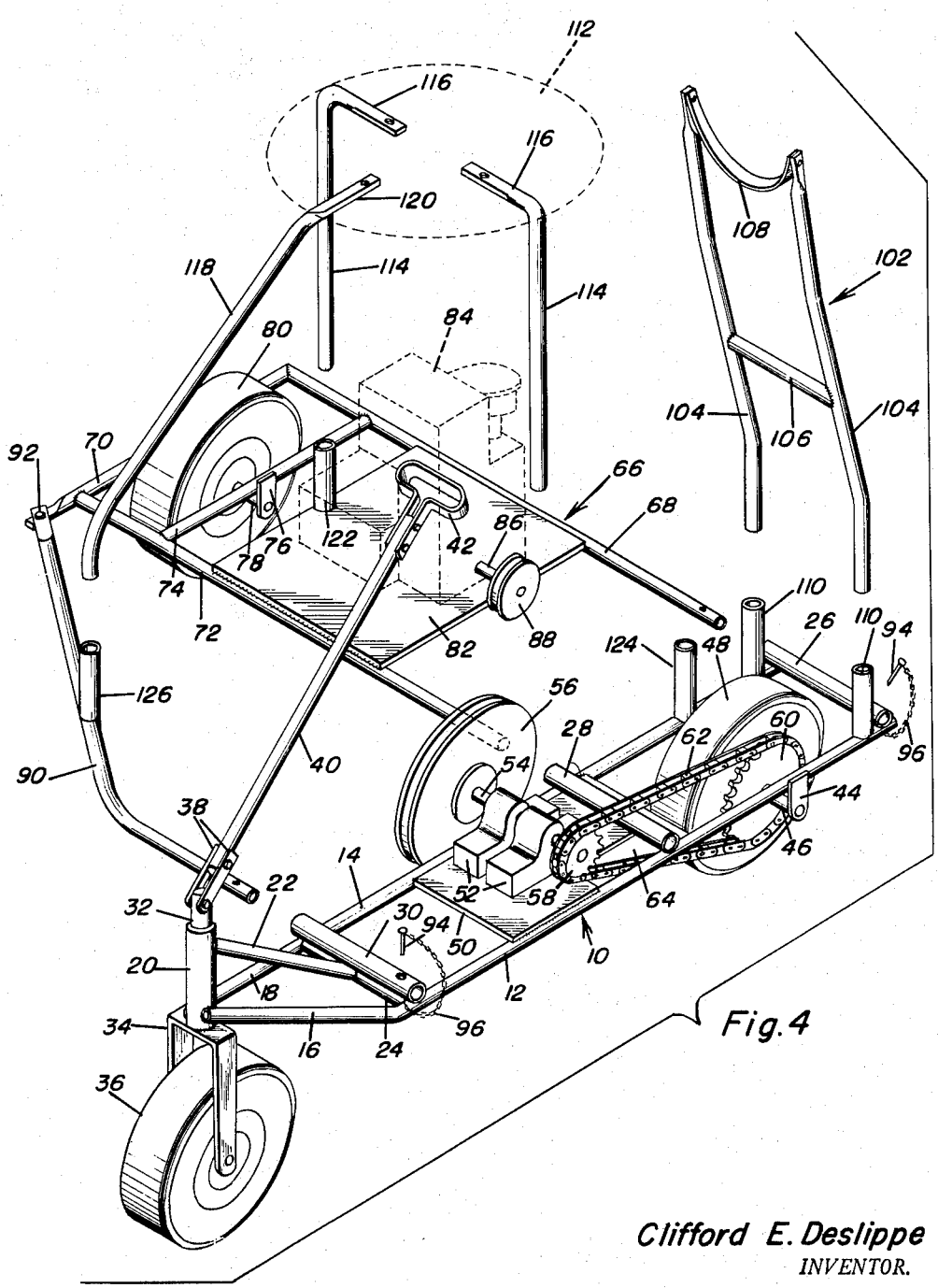

Figure 3 is an enlarged fragmentary vertical sectional view taken substantially upon the plane indicated by the section line 3—3 of Figure 2 and shows the manner in which the frame members are removably secured together; and Figure 4 is an enlarged exploded perspective view of the portable caddy cart and shows the same in its knocked-down state, the seat and motor of the caddy cart being shown in dotted lines for purposes of clarity.

Referring now to the drawings in detail, it will be seen that the portable caddy cart, which is the subject of this invention includes a wheeled frame which is referred to in general by the reference numeral 10. The wheeled frame 10 includes a pair of longitudinally extending frame members 12 and 14 which are in generally spaced parallel relation and which have their forward end portions 16 and 18, respectively, extending upwardly and forwardly in converging relation. The forward end portions 16 and 18 are secured to the lower part of a vertically extending neck 20. The neck 20 is braced by a downwardly and rearwardly extending brace 22 which has its forward end connected to the upper part of the neck 20 and its lower end connected to a transverse frame member 24.

The wheeled frame 10 also includes a rear transverse frame member 26 which extends between the frame rails 12 and 14 and has its ends secured thereto in overlying relation. The intermediate portions of the frame rails 12 and 14 are connected together by an intermediate transverse frame member 28 which is secured to the frame rails 12 and 14 in the same manner as is the rear transverse frame member 26. Overlying the transverse frame member 24 and secured to the frame rails 12 and 14 is a forward transverse frame member 30. The frame members 26, 28 and 30 lie in a common horizontal plane above the general plane of the frame rails 12 and 14.

Extending upwardly through the neck 20 and rotatably journalled therein is a neck 32 of a fork 34. Rotatably journalled in the fork 34 is a steerable front wheel 36. The stem 32 has pivotally connected thereto by a pair of straps 38 a rearwardly extending steering arm 40. The rear end of the steering arm 40 is provided with a suitable handle 42 to facilitate movement thereof.

Extending downwardly from the frame rails 12 and 14 adjacent their rear ends are depending straps 44. The straps 44 have extending therebetween below the frame rails 12 and 14 a rear axle 46. Rotatably mounted on the rear axle 46 within the general confines of the frame members of the wheeled frame 10 is a rear drive wheel 48.

Extending between and secured to the intermediate portions of the frame rails 12 and 14 is a flat plate 50. Carried by the plate 50 is a pair of transversely spaced pillow blocks 52. Rotatably journalled in the pillow blocks 52 is a transversely extending shaft 54. The shaft 54 is provided with a drive pulley 56 on the end thereof adjacent the frame rail 14, the drive pulley 56 being disposed outwardly of the frame rail 14. The end of the shaft 54 adjacent the frame rail 12 is provided a suitable sprocket 58. The sprocket 58 is in longitudinal alignment with a sprocket 60 carried by the drive wheel 48. Entrained over the sprockets 58 and 60 for drivingly connecting the two is a driving chain 62. The drive chain 62 has a portion thereof passing downwardly through an opening 64 in the plate 50.

The portable caddy cart also includes a side car which is referred to in general by the reference numeral 66. The side car 66 includes an elongated transversely extending detachable rear frame member 68 which is connected at its end remote from the wheeled frame 10 to a longitudinally extending frame member 70, the longitudinally extending frame member 70 extending forwardly from its intersection with the transversely extending rear frame member 68. Secured to the longitudinally extending frame members 70 adjacent its forward end is an intermediate transversely extending frame member 72. The frame member 72 is in spaced parallel relation with respect to the frame member 68. The frame members 68 and 72 are connected by an intermediate longitudinal frame member 74 which is disposed adjacent but in spaced parallel relation with respect to the longitudinally extending frame member 70.

Carried by the longitudinally extending frame member 70 and the frame member 74 are depending straps 76. The straps 76 have extending therebetween below the general plane of the frame members 70 and 74 a transversely extending axle 78. Rotatably journalled on the axle 78 is a supporting wheel 80.

Extending between and secured to the frame members 68 and 72 adjacent the wheel 80 is a mounting plate 82. Suitably secured on the mounting plate 82 is a conventional internal combustion engine 84 which forms the power unit for the portable caddy cart. The internal combustion engine 84 includes a drive shaft 86 on which is mounted a pulley 88.

A frame of the side car 66 also includes a forward frame member 90 which is angular in outline and has one end thereof pivotally connected to the forward end of the longitudinally extending frame member 70 by a pivot pin 92. The opposite end of the frame member 90 is disposed in spaced parallel relation to the frame members 68 and 72.

It will be noted that the free end portions of the frame members 68, 72 and 90 are spaced apart the same distance as the transverse frame members 26, 28 and 30, respectively, of the wheeled frame 10. The side car 66 is removable from the wheeled frame 10 and is secured thereto by the insertion of the free ends of the frame members 68, 72 and 90 into the transverse frame members 26, 28 and 30, respectively. The frame members 68, 72 and 90 are retained in their respective frame members by pins 94 extending through aligned apertures in the frame members. The pins 94 are secured against loss to the frame rail 12 by a suitable chain 96.

Referring now to Figure 2 in particular, it will be seen that when the side car 66 is secured to the wheeled frame 10, the pulleys 56 and 88 are in longitudinal alignment. The pulley 88 is then drivingly connected to the pulley 56 by a drive belt 98. In this manner the internal combustion engine 84 may be drivingly secured to the drive wheel 48 to provide power for the drive wheel.

In order that a golf bag, such as the golf bag 100 may be supported in the position illustrated in Figure 1, the portable caddy cart also includes a detachable golf bag supporting rack which is referred to in general by the reference numeral 102. The supporting rack 102 includes a pair of spaced parallel frame members 104 which extend upwardly and slightly forwardly. The frame members 104 are connected together intermediate the ends by a transverse frame member 106 and at their upper ends by a yoke 108.

In order that the supporting rack 102 may be suitably secured to the wheeled frame 10, the wheeled frame 10 includes a pair of upwardly directed sockets 110 secured to the rear portions of the frame rails 12 and 14. The sockets 110 selectively receive the lower ends of the frame members 104. It will be understood that the supporting rack 102 is retained in position by its own weight.

Referring now to Figure 1 in particular, it will be seen that the golf bag 100 is retained in position on the portable caddy cart by having its lower end rested upon the transverse frame member 30 and its upper portion seated in the yoke 108. It will be noted that the golf bag 100 is so supported whereby golf clubs carried therein may be quickly and easily removed therefrom and replaced therein.

In order that a golfer may also ride on the portable caddy cart, the portable caddy cart is provided with a detachable seat 112. The seat 112 is supported by a pair of standards 114 which include opposed horizontally disposed upper portions 116 which are suitably secured to the underside of the seat 112. The seat 112 is also braced by a downwardly and forwardly extending brace 118 which has a horizontal upper rear portion 120 also secured to the underside of the seat 112.

In order that the seat 112 may be removably secured to the other portions of the portable caddy cart, the mounting plate 82 of the side car 66 is provided with an upwardly open socket 122. The socket 122 receives the lower end of the outermost standard 114. The wheeled frame 10 includes an upwardly opened socket 124 which is secured to the frame rail 14 in transverse alignment with the socket 122. The socket 124 receives the lower end of the innermost standard 114. The frame member 90 of the side car 66 is also provided with an upwardly opened socket 126. The socket 126 receives the vertical lower end portion of the brace 118. It will be understood that the seat 112 is retained in position due to its own weight. From the foregoing, it will be seen that there has been illustrated and described a novel portable caddy cart which is so designed whereby it may be utilized in the traversing of a golf course by a golfer with the golfer riding in the caddy cart and the golf bag carried thereby alongside him. Also, it will be seen that the portable caddy cart is so constructed whereby it may be easily steered and otherwise operated. Further, it will be seen that due to the fact that the seat 112, the supporting rack 102, the side car 66 and the wheeled frame may all be quickly and easily disassembled, with the various portions being placed in the trunk of one's car the portable caddy cart is ideal for nearly all golfers. It is to be understood that one of the major advantages of the present invention is the ease in which the various components thereof may be assembled and disassembled.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A portable readily disassembled power land vehicle for supporting and transporting golf bags and the like, comprising a first vehicular frame member including a steerable wheel rotatably supported at one end thereof and a drive wheel rotatably supported at the other end thereof, power transfer means rotatably supported on said frame member between said wheels, means operatively associated between said power transfer means and drive wheel for transferring power to said drive wheel, forward, rear and intermediate parallel brace and coupling elements longitudinally disposed in spaced transverse relationship on said frame member, vertically extending, transversely spaced connecting members for removably supporting an article support rack on said frame member, a lateral side car member detachably connected to said first frame member, said side car member including forward, rear and intermediate frame elements including free end portions detachably connected to the longitudinally disposed brace and coupling elements on the first frame member, said side car member rotatably supporting an outboard wheel, a power source carried by said side car member including a power outlet member detachably connected to the power transfer means on said first frame member, and a detachable operator seat removably supported by the first and side car members, the forward frame element of the side car member including a vertically extending support element intermediately disposed thereon, said side car member including a second vertical support element secured thereon, said first frame member including a third vertical support element thereon, said aforementioned vertical support elements removably supporting the detachable operator seat.

2. A portable power land vehicle as set forth in claim 1 wherein the plurality of longitudinally disposed parallel brace and coupling elements of said first frame member are tubular elements slidably receiving the parallel frame elements of the side car member, said brace and coupling elements and second frame elements including alignable transverse apertures extending therethrough, and removable lock pin means slidably received in the transverse apertures.

References Cited in the file of this patent

UNITED STATES PATENTS

| | | |
|---|---|---|
| 1,036,396 | Williams | Aug. 20, 1912 |
| 1,177,210 | Pooley et al. | Mar. 28, 1916 |
| 1,231,163 | Jaggard | June 26, 1917 |
| 2,463,972 | Jackson | Mar. 8, 1949 |

FOREIGN PATENTS

| | | |
|---|---|---|
| 169,016 | Austria | Oct. 10, 1951 |
| 676,595 | France | Nov. 29, 1929 |
| 823,518 | France | Oct. 18, 1937 |